United States Patent
Thompson

[15] 3,680,230
[45] Aug. 1, 1972

[54] PRACTICE DEVICE

[72] Inventor: Philip H. Thompson, 1668 Euclid, St. Paul, Minn. 55106

[22] Filed: Dec. 14, 1970

[21] Appl. No.: 97,952

Related U.S. Application Data

[63] Continuation-in-part of Ser. No. 832,033, June 10, 1969, abandoned.

[52] U.S. Cl..............................................35/74, 40/70
[51] Int. Cl.................................................G09b 1/22
[58] Field of Search......35/12 F, 74; 40/70; 116/133; 235/78, 88, 61 NV; 273/141 R

[56] References Cited

UNITED STATES PATENTS 2,508,894    5/1950    Schloer..............................40/70

Primary Examiner—Harland S. Skogquist
Attorney—Robert C. Baker

[57] ABSTRACT

Devices and methods are disclosed for use in ground practice and for game purposes to teach proper runway selection for landing at a simulated runway layout. A pilot board is provided for use by a person assuming the part of an aircraft pilot; and a controller board is provided for use by a person assuming the part of an air traffic controller.

15 Claims, 9 Drawing Figures

PATENTED AUG 1 1972  3,680,230

INVENTOR.
PHILIP H. THOMPSON
BY
Robert C Baker

INVENTOR.
PHILIP H. THOMPSON
BY
*Robert C. Baker*
ATTORNEY

PRACTICE DEVICE

This application is a continuation-in-part of my now abandoned application Ser. No. 832,033, filed June 10, 1969.

The pilot board has a disk carrying a runway layout with its runway approaches coded and with an orientation mark fixed on it. This disk is mounted to a base which carries orientation marks plus a fixed detector of an assumed compass direction such as North.

The controller board also is equipped with a disk and base; and the controller board carries on these elements special markings coordinated with the pilot board so that a controllers instructions to an incoming pilot as to the land direction he should take at the runway layout is verifiable by using the code figure representative of the runway approach selected by the pilot. The controller board additionally is equipped with a special spinner for selection of the directional instructions to be given to a pilot for landing. Both boards have means for relative rotary indexing of the disks and bases, with this means friction biased to oppose free spinning motion.

This invention relates to the art of training aircraft pilots in selection of the proper runway for landing. In particular, the invention is directed to devices and methods for ground training of personnel so that they develop skill in visually orienting themselves to a simulated airport runway layout and then select expeditiously the proper runway of the layout for landing in accordance with a hypothetical air traffic controllers instructions.

Aircraft pilots, especially those with relatively few flying hours, sometimes experience difficulty in executing the runway landing instructions given by an air traffic controller. This invention provides materials for ground practice in runway selection. The materials of this invention, however, are also useful for enjoyable game purposes, whether or not the persons participating are especially interested in becoming skilled aircraft pilots.

An incoming pilot is aware of the compass bearing toward which his plane is headed by inspecting on-board instruments. He needs instructions from an air traffic controller on such matters as the proper time for his landing, wind direction, and the runway on which he should make his landing. The significant instruction from the standpoint of this invention is the approach end of the runway on which the pilot should land. In giving this instruction, the traffic controller employs a simple code, which normally amounts to a whole number up to and including number 36. This number given by the controller is a compass bearing in 10° increments, e.g., no. 1 meaning 10°, no. 20 meaning 200°, etc. The pilot then must approach and land on the proper runway which heads into the general compass bearing indicated by the number from the controller. The problem of doing so, however, is compounded by the fact that runway selection should be made as the pilot is incoming toward the runway layout from any direction (not simply from the south, which makes the problem relatively simple).

Insofar as is known, the question of practicing proper runway selectiOn from varied incoming angles to an airport runway layout has never been the subject of realistic devices permitting effective ground teaching of this skill. This invention provides such devices. The devices not only simulate or create realism in terms of the runway selection problem confronting an airborne pilot, but also permit a measure of practice in estimating or determining the proper landing approach pattern to be used.

According to this invention, a pilot board is provided for use by a person assuming the part of a pilot and a controllers board is provided for use by person assuming the part of an air traffic controller.

The pilot board consists essentially of a disk member and a base member. These members are united together for relative rotary indexing of one with respect to the other about an axis coinciding with the axis for the disk member. Means on each member permits the establIshment of a variety oF selected rotary orientations of the disk member with respect to the base member. On the base member is a visibly distinct fixed indicator of a compass direction for the person playing the part of a pilot to use in orienting his position to the pilot board. (At least this feature is preferably present on pilot boards of the invention for use by beginners; it is omitted from boards used for advanced training.) On the disk member of the pilot board is a visibly distinct simulated airport runway layout including at least one runway (and usually at least two runways disposed at angles to each other, with each end of each runway marked with a visibly distinct runway approach code figure. Each one of the code figures is different from the others so that each end of a runway is readily identifiable. All of these visibly distinct elements are viewable frOm one face of said pilot board. Also, the relative rotary indexing between the members of the pilot board is preferably friction-biased to oppose free spinning motion of one of the members with respect to the other. This permits a selected orientation of the disk with respect to the base to be relatively easily maintained during the use of the pilot board in solving a particular landing problem as the board is used in practice or game activity.

A preferred means for orienting the disk member of the pilot board with respect to its base member consists essentially of visibly distinct orientation marks on each of those members. One such mark is on one member at a radially disposed location from the axis of indexing and a plurality of such marks are annularly spaced on the other member at radially disposed locations from that axis. Each one of the annularly spaced orientation marks should be different from the others. This permits positioning of the one such orientation mark toward any one of the annularly spaced orientation marks to establish a selected orientation.

The controller board is especially designed for use with a pilot board of the type aforenoted. The controller board includes a disk unit and base unIt for member united together for relative rotary indexing of one with respect to the other about an axis coinciding with the axis for the disk unit. This rOtary indexing is preferably friction-biased to oppose free spinning motion of one of the units with respect to the other. Also, the controller board includes means to establish a variety of selected rotary orientations of one of the units (e.g., the disk unit) with respect to the other unit (e.g., the base unit) corresponding to selected orientations between the disk member and base member of the pilot board.

On the one unit (e.g., disk unit) of the controller board are a plurality of annularly spaced view sites at locations equidistantly radially disposed from the axis of rotary indexing between the units of the pilot board. The number of view sites on this one unit is equal to two times the number of runways of the layout on the pilot board. A view site is located at each radial location as determined by making the radial angle between that radial location and a predetermined mark on said one unit equal to an angle on the pilot board as formed at the intersection between a runway and a line parallel to a radial line through a corresponding predetermined mark on the disk member of the pilot board. A visibly distinct runway approach code figure is associated with each view site; and each such code figure corresponds in character to the runway approach code figure at the end of the runway on the pilot board to which the view site corresponds.

On the other unit (e.g., base unit) of the controller board is located an (e.g., sequence of numerals at radially disposed locations permitting view of the same at the view sites at selected orientations between the two units of the controller board. These numerals are representations of graduated compass directions; and they are so arranged that, when the one (e.g., disk) unit and other (e.g., base) unit are in selected orientation identical to a selected orientation between the members of the pilot board, the numeral viewed at a selected view site constitutes an indicator of a compass direction toward which an aircraft should land. That compass direction constitutes the direction of final approach for landing; and the proper approach end of a simulated runway on the pilot board for effecting that landing direction carries a runway approach code figure corresponding to the runway approach code figure associated with the selected view site.

A modification of this other unit (e.g., base unit) of the controller board, especially useful to introduce directional orientation problems for a pilot during advanced training is that involving a separation of this other unit (base unit) into two parts: one termed an orientation part and the other a compass part. The orientation part carries at least one orientation mark on it (or several such marks), as necessary for the accomplishment of selected orientation between the units of the controller board in a manner corresponding to orientation between the members of the pilot board. The other, that is cOmpass part, carries the annular sequence of numerals representative of compass landing directions. Means are provided for effecting rotary shifting of the orientation part with respect to the compass part. This shifting occurs about the same axis as that for rotary indexing between the disk unit and base unit of the controller board.

Still further, the controller board preferably includes a spinner mounted for relatively free spinning motion at the axis of indexing between the disk and base units. The spinner serves at rest as a pointer for selection of a view site and the numeRal indicating compass direction as observed thereat.

In using these boards for simulated practice or game purposes, the member of each board are first placed in corresponding orientation.

However, where the controller board is of the type permitting rotary shifting of a compass part with respect to an orientation part, it is preferably that the person assuming the role of controller first shift the compass and orientation parts (of his board) at will. Then he mentally selects a specific orientation mark on the orientation part and advises the person assuming the role of pilot as to that mark (which is also present on the pilot board) as well as the specific true (non-coded) compass bearing assumed for that mark in the problem (as said compass bearing is determined by the relationship of the "contrOllers" orientation and a compass parts). Then, the "controller" advises the pilot that he is headed in any selected arbitrary compass direction. The "controller" may also advise the "pilot" that the airport under the assumed problem conditions is directly ahead of the pilots flight path, or to the left or right, as the "controller" (or for that matter, the "pilot") may elect. Thereafter, (or earlier, if desired), the "controller" selects an assumed orientation between the two fundamental units (disk and base) of the composite controller board and advises the "pilot" to place the disk member and base member of his board in corresponding orientation.

The person assuming the part of a pilot places the pilot board before him so that he is, relatively speaking, looking at it from the assumed incoming direction for his assumed aircraft. The person taking the part of a controller spins the spinner on his board and calls a number to the pilot indicating compass direction. This number is chosen by looking at or through the view site by or nearest the indicator end of the spinner. The "pilOt" calls the code figure at the end of a runway which he believes to be the correct runway approach end in light of the number given by the "controller." The "controller" notes the code figure at the view site (i.e. the view site from which he called the number indicating compass direction) and advises whether or not the "pilot" has selected the proper runway approach end consistent with the "controllers" instructiOns. A number of variations may be introduced into this procedure to increase or decrease the challenge. For example, the decisional time for the "pilot" after being given the compass direction number may be limited. Federal aviation regulations governing communication between participants may strictly be obServed.

The invention will further be described by reference to a drawing made a part hereof wherein.

Figure 1:
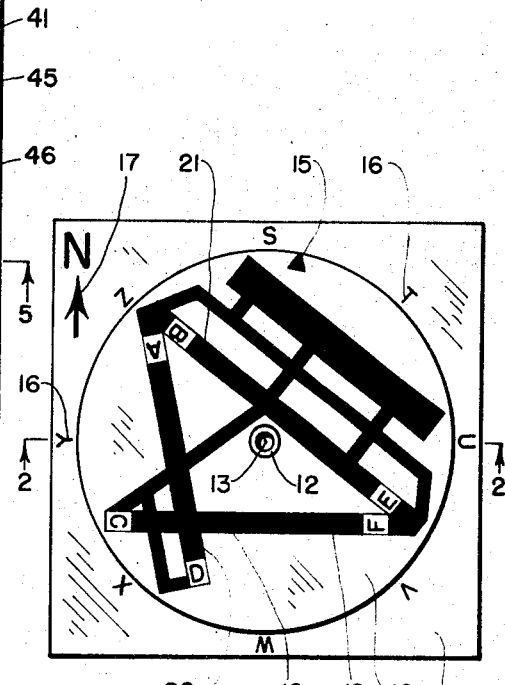
FIG. 1 is a top plan view of a pilot board.
Figure 2:
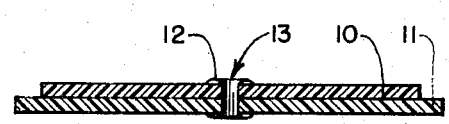
FIG. 2 is a cross-section taken on line 2—2 of FIG. 1.
Figure 6:
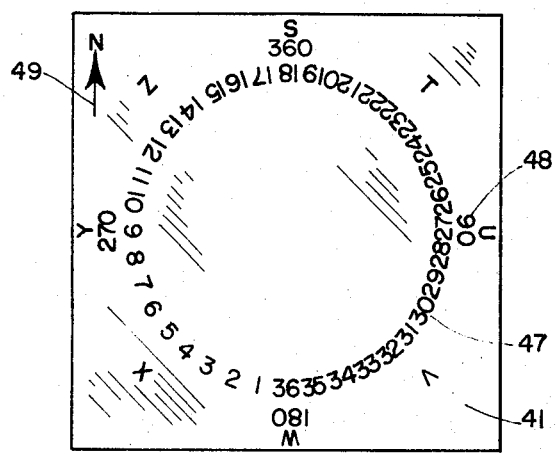
FIG. 6 is a top plan view of an illustrative base unit for a controllers board.
Figure 3:
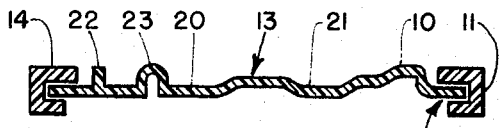
FIG. 3 is a cross-section through an alternate pilot board.

Referring to FIGS. 1-3 inclusive, the pilot board comprises a disk member 10 and a base member 11, with means 12 uniting these members together for relative rotary indexing of one with respect to the other about an axis 13 coinciding with the axis for the disk member. Means 12 in FIGS. 1 and 2 is illustrated as a sleeve fastener with its ends outwardly flarred (or even crimped) upon the surrounding central surfaces of disk member 10 and base member 12 so as to impart a friction bias opposing free spinning motion between members 10 and 11. This friction-biased mounting permits a selected orientation between members 10 and 11 to be relatively easily or readily maintained during ordinAry handling of the entire pilot board in use. An alternate means for uniting or fastening the disk member 10 and base member 11 to gain a friction-bias or opposition to spinning action is illustrated in FIG. 3, where the periphery of the disk member 10 is united to the base member 11 by cooperating male and female structures. Specifically, the periphery of the disk 10 is within a female-like annular recess of a ring-like base member 11. The base member 11 in FIG. 3 consists essentially of a flat flange part 14 which extends radially beyond disk 10 and constitutes one leg of a U-shaped annular member having its U-shaped recess axially directed.

The pilot board also includes means to establish a variety of selected rotary orientations of the disk member 10 with respect to the base member 11. Illustratively, a single visibly distinct orientation mark 15 is fixed on one of the members such as disk 10 at a radially disposed location from the axis of indexing between the members; and a plurality of visibly distinct annularly spaced orientation marks 16 are fixed on the other member (e.g., base member 11) at radially disposed locations from that axis. Each one of the annularly spaced orientation marks 16 is different from the others. Illustratively, letters of the alphabet (e.g., S through Z) may be chosen for these annularly spaced orientation marks. A suitable spacing is at about 30° radial increments, or about 45° radIal increments as illustrated or at some other selected spacing. Disk member 10, with a single orientation mark 15, may be indexed so as to place that orientation mark 15 toward, or at, anyone of the annularly spaced orientation marks 16 on the base member 11. In this manner, any selected orientation between the disk member and base is easily established and easily communicated.

On the base member 11 of the pilot board is a visibly distinct fixed indicator 17 identifying or establishing an assumed compass direction. Preferably, the compass direction so indicated is north, as illustrated in FIG. 1. But this feature is optional as aforenoted. Suitably, if desired, a fixed indicator for general positioning or orientation of the pilot board may be used, such as a label "top" near the orientation mark, "S," on the board. Alternately it can be agreed that "S" represents the top.

A simulated runway layout 18 is visibly distinct on the disk member 10. It is fixed or united to disk 10 as an integral part thereof. This simulated runway layout includes at least one runway (which creates sufficient problems for beginners), but preferably includes at least two or three runways disposed at angles to each other. The drawing illustrates three runways 19, 20 and 21 disposed at angles to each other. All of the runways lie essentially in the same plane. Each end of each runway is marked with a visibly distinct runway approach code figure; and each of these code figures is different from the others. Illustratively, letters of the alphabet A through F inclusive are chosen as the runway approach code figures, as illustrated in FIG. 1.

The visibly distinct elements of the pilot board are viewable at all times from one face of that board. Conveniently, this is accomplished by printing or painting the elements upon paperboard or metal or plastic disk members and base members. A variety of pigmented paints or inks may be used for this purpose, with the pigment mass for the painted or printed layers maintained different from any pigment mass covering the surface of the disk or base members. Alternately, transparent plastic (e.g., polymethylmethacrylate) disk or base members may be employed and the visibly distinct markings applied by etching (or the backgRound for the visibly distinct elements may be etched, leaving the elements transparent).

In the structure for the pilot board is illustrated in cross-section in FIG. 3, it is especially desirable to employ organic plastic as the material for disk member 10 and base member 11. To add realism, disk member 10 may be embossed or shaped to provide a relief which simulates various characteristics of the terrain adjacent a chosen runway layout. For example, a building 22 may be formed in the disk 10 adjacent a tower-like structure 23; but runways 20 and 21 should lie in essentially the same plane even in a relief type simulated airport layout. An interesting advantage for the structure in FIG. 3 is that the rotary indexing of the disk member 10 with respect to the base member 11 is conveniently accomplished and yet the wear characteristics on repeated indexing between the members illustrated in FIG. 3 is such that spinning after repeated use is quite unlikely to occur.

Now referring to FIGS. 4 through 7 inclusive, the nature of the board or article used by the hypothetical air traffic controller will be explained. This board is to be used in combination with a pilot board of the type aforediscussed. The controller board itself includes a disk unit 40, and a base unit 41. Means 42 (see FIG. 5) unite the disk unit and base unit together for relative rotary indexing of one with respect to the other about an axis coinciding with the axis for the disk unit. This relative rotary indexing is also preferably friction-biased similarly to the friction-biasing between the disk member and base member of the pilot board. Thus the means 42 uniting the disk unit and base unit may be similar to the means 12 uniting the disk member and base member of the pilot board. A spinner is mounted at the axis for relatively free spinning motion. Other elements and relationships for the controller board are governed by or related to certain elements and relationships of the pilot board.

The means to establish a selected rotary orientation of the one (or disk) unit 40 with respect to the other (or base) unit 41 of the controllers board is analogous to the means for establishing selected rotary orientations between the disk member 10 and the base member 11 of the pilot board. In other words, the orientation means between the units of the controllers board corresponds to the orientation means for the pilot board, with the orientation marks and radial location thereof on the one unit and other unit of the controllers board corresponding respectively to the orientation marks and radial location thereof on the disk member and base member of the pilot board. Thus, with respect to the markings illustrated in FIG. 1, and in terms of the specific controller board illustrated in FIG. 4, the disk unit 40 of the controllers board carries a single orientation mark 44 which is visibly distinct and radially disposed from the axis of indexing. The base unit 41 of the controllers board carries a plurality of visibly distinct annularly spaced orientation marks 45 (e.g., letter of the alphabet S through Z inclusive) also at radially-disposed locations from the axis of indexing. If the single orientation mark were placed on the base member of the pilot board and the plurality of annularly spaced radially disposed orientation marks on the disk member of the pilot board, then the same respective relationship would be employed for the controllers board; that is, the single orientation mark would be on the base unit (or the unit of the controllers board carrying compass direction numerals, to be discussed) and the annularly spaced orientation marks would be on the disk unit (or the unit of the controllers board carrying view sites and associated runway approach code figures, to be discussed).

An important feature of the controllers board is that a plurality of annularly spaced view sites or ports 46 are carried on one unit such as disk unit 40. These view sites may be formed by cutting out a hole in the disk unit 40 to form a port. They may be formed by notching a peripheral edge of disk unit 40, or by printing or otherwise marking a site or location on the one unit such as disk 40. Useful sites may be formed by etching a view site or port frame in an otherwise transparent disk unit (e.g., one formed of plastic such as polymethylmethacrilate). View sites 46 are equidistantly radially disposed from the axis about which the rotary indexing between the disk unit and base unit is accomplished.

The number of these view sites on the one unit such as disk 40 is equal to two times the number of runways on the disk member of the pilot board. These view sites will be noted to be in pairs which are diametrically opposite each other on the one unit such as disk 40; and each view site represents an approach end of a runway 19, 20 or 21 of the disk member of the pilot board. Characteristically, therefore, a view site is at each radial location on the disk unit 40 as determined by a formula. The formula requires that the radial angle between the radial location of a view site and a predetermined orientation mark on the one unit (disk unit) must be equal to an angle on the pilot board as formed at the intersection between a runway on the pilot board and a line parallel to a radial line through the corresponding predetermined orientation mark on the disk member of the pilot board. It is very important to maintain the view site relationships as just discussed. Each view site in fact represents an approach end of the runway on the pilot board. A simple way to establish view site locations in manufacture is to place the disk member of the pilot board and disk unit of the controller board in synchronized compass orientation. Then establish the compass direction for each runway 19, 20, and 21 and draw a diameter line on disk unit 40 (through its axis) for the compass direction of each such runway. The view ports are located at the radially outward locations on these lines.

Beside or adjacent or associated with each view site 46 on the one or disk unit 40 of the controllers board is a visibly distinct runway approach code figure which corresponds in character to the runway approach code figure at the end of the runway on the pilot board to which the view site corresponds. For example, the approach ends C and F of runway 19 on the pilot board correspond respectively to the view ports 46 identified as C and F on the disk unit 40.

On the other or base unit 41 of the controllers board (see FIGS. 4 and 6) is an annular sequence of numerals 47 at radially disposed locations permitting view of the same at or through the view sites of the disk unit as the units of the controllers board are rotationally indexed with respect to each other. These numerals 47 are visibly distinct representations of graduated compass directions; and preferably, from the standpoint of complying with the practice as used in air traffic control, these numerals are indicia of compass directions at 10° increments up to and including the numeral 36, which indicates true north. The arrangements of these numerals is such that, when the units (e.g., disk unit 40 and base unit 41) of the controller board are in a selected orientation identical to (that is, corresponding to) a selected orientation for the members of the pilot board, the numeral viewed at a selected view site of the controllers board constitutes an indicator of a compass direction toward which an aircraft should land. The proper approach end of a simulated runway on the pilot board to effect that landing direction carries a runway approach code figure corresponding to the runway approach code figure adjacent the selected view site. For example, in FIG. 4 of the drawinG, the view site adjacent to which the runway approach code figure C is carried allows the viewing of the numeral 9. This numeral 9 indicates that landing should be accomplished at 90°, i.e., with the aircraft approaching the end of a runway at the simulated runway layout 18 which will cause the aircraft to land in an easterly direction. Runway 19 on the pilot board is represented by view sites labeled C and F of the disk unit of the controllers board; and it is clear that the pilot should land at approach end C of runway 19 under these assumed conditions.

Since the end of the runway identified by the code figure C is placed on the controllers board at a respective assumed relative location comparable to the approach end C of runway 19 on the pilot board, the numerals 47 on the base unit of the controllers board indicating compass direction in 10° increments must be so arranged that, for example, numeral 36 is in a location which might ordinarily be considered to be a southerly location. However, it will be recognized that a view site over such numeral 36, as the illustrated controllers board is used in practice, represents an approach end of a runway headed north. Thus, when numeral 36 is called to a pilot, he must approach and land on a runway toward a northerly direction. If the labeling of the code figures for the runway approach ends on the disk unit 40 of the controllers board were reversed (e.g., with the view port carrying the runway approach end C in FIG. 4 marked with F instead of C and the diametrically opposite view port marked with C), then the numerals 47 constituting the representations of graduated compass directions on the base unit of the controllers board could be disposed in a compass rose manner with the numeral 9 toward the east and the numeral 36 at the northerly location as is more common. This arrangement would, of course, also necessitate suitable arrangement of the orientation symbols to permit the required coordinated orientation between the pilot and controller boards.

As an optional feature, but a very convenient feature for practical use of the controllers board, it is desirable to add a compass rose 48 on the base unit 41 as an annulus of indicia intermediate orientation marks 45 and numerals 47. The compass rose should always be visible to the person using the controllers board. (It is particularly useful in the step of determining wind direction assumptions using a pointer, as to be discussed.) Alternately, or in addition, a fixed indicator of an assumed compass direction (consistent with the array of orientation marks on the board), such as arrow 49 for assumed true north, may be added.

A still further optional feature which may be added to the controllers board is that of a means for temporarily recording the incoming aircraft approach angle to the airport layout. Illustratively, a groove 50 in the base unit 41 may have annular lip members 51 and 52 for interlocking and carrying an annular flat ring 53 on which a single aircraft indicia location mark is placed so that a controller or person playing the part of a controller may rotationally index the annular ring 53 within this groove 50 to place the location of the aircraft indicia at an incoming angle on the controller board as assumed to be the incoming approach angle toward the simulated runway layout to be taken by a person playing the part of a pilot. Alternately, a simple arrow-like strip (preferably transparent) may be interposed between the disk unit 40 and base unit 41 (and attached to the axis uniting means 42) for radial shifting to temporarily record the assumed incoming direction for an aircraft; or a separate object such as a small model aircraft may be used for this purpose.

Figure 5:
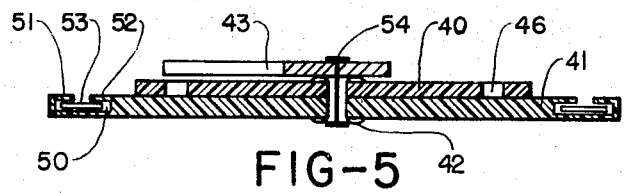
FIG. 5 is a cross-section taken on line 5—5 of FIG. 4.

In the showing of FIG. 5, the spinner 43 is so mounted on a pin 54 at the axis of indexing that spinner 43 rests on flanged surfaces of the sleeve fastener 42 for relatively frictionless or free spinning motion. One end of spinner 43 suitably is labeled as a wind direction end 55 (i.e., the direction from which the wind is flowing); and the other end 56 serves, when the spinner comes to rest, as a pointer or the like by which the compass direction for landing is determined from the numeral 47 viewed at a view site nearest the pointer end 56.

Figure 4:
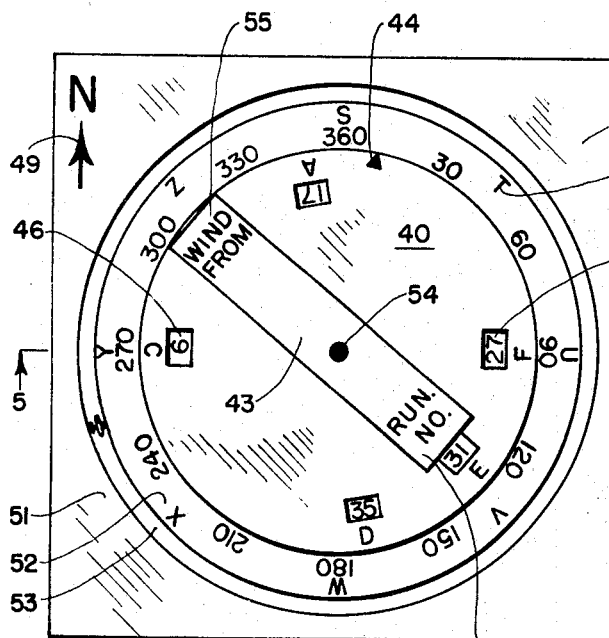
FIG. 4 is a top plan view of air traffic controllers board.
Figure 7:
FIG. 7 is a cross-section through an alternate controller board.

In FIG. 7, a cross-section through an alternate type of controllers board is illustrated wherein the one unit 57 (analogous to disk unit 40 of FIG. 1), carrying view sites disposed as discussed with respect to FIG. 4, is in the nature of a flat annular flange (i.e., a disk with its center portion removed). Unit 57 constitutes one leg of an axially directed U-shaped recess. The other unit 58 (which by analogy corresponds to base 41 of FIG. 1), carrying the numerals of compass direction at ten degree increments, is of circular or disk character and fitted with its periphery extending into and carried by the recess of the U-shaped member 57 for rotary indexing. If desired, the features carried by these parts may be reversed (e.g., with circular member 58 carrying the view sites and U-shaped member 57 carrying the compass numerals); but in such cases the base unit and disk unit will be formed of suitable materials, whether transparent or otherwise, to make view sites apparent and the compass numerals for landing instructions visibly apparent. (For example, direction numerals may be printed on a transparent unit 57, and the view sites marked on unit 58 by a square or rectangle or circle of opaque or pigmented area or area visibly distinct from other parts of unit 58).

As in the case of the pilot board, a similar wide variety of materials may be employed to form the structural features for the controller board; and the specific shapes and relationships for the boards of the invention may also vary, within the framework of equivalents for the essential features and relationships, as aforediscussed. Generally, greatest economy is accomplished by using paperboard for a disk unit and base unit, or equivalents, with view sites formed by cutting out small rectangular sections and with various identifying indicators formed by painting or printing a visibly distinct layer of pigment. But metal (e.g., particularly aluminum) and plastic base materials are more durable and are very satisfactory to employ. For the propose of introducing new challenges as practice or game activity progresses, the boards of the invention may be made to permit substitution of parts. For example, replaceable coordinated disk members and units for the boards (with varied runway layouts and view sites) may be provided.

Figure 8:
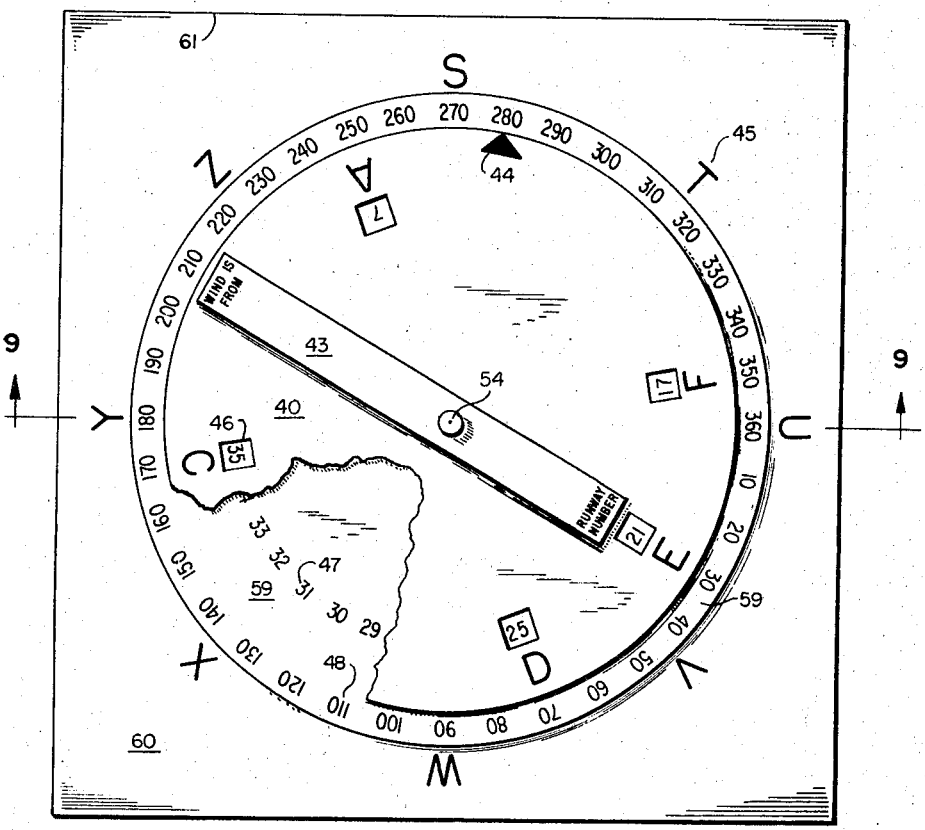
FIG. 8 is a top plan view of a modified controller board.
Figure 9:
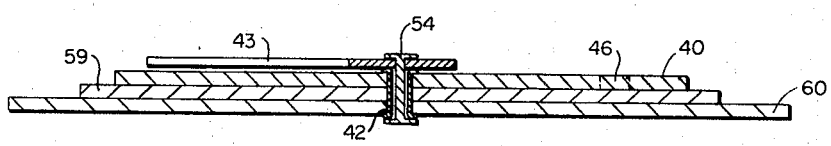
FIG. 9 is a cross-section taken on line 9—9 of FIG. 8.

FIGS. 8 and 9 illustrate a still further modification for a controllers board, especially one useful in presenting versatile new challenges to a student pilot of reasonably advanced skill. The controllers board of these figures may in all respects be comparable to the controllers board of FIGS. 4–6, except that the "other" unit (identified as the base unit 41 in FIG. 4) which carries the annular sequence of numerals 47 representative of compass landing directions is separated into two parts, namely a compass part 59 and an orientation part 60. Thus the board of FIGS. 8 and 9 is formed of a composite base unit having parts 59 and 60. The orientation part 60 carries at least one orientation mark on it (or several such marks 45, as illustrated), as necessary for the accomplishment of selected orientation between the units (i.e., disk and composite base) of the controllers board in a manner corresponding to orientation between the disk and base members of the pilot board. The other or compass part 59 (that is, the compass part 59 of the composite base unit of the controllers board of FIGS. 8 and 9) carries the annular sequence of numerals representative of compass landing directions. These numerals are generally, as aforenoted, arranged in a coded manner which is opposite to their position in a normal compass rose (see FIG. 6 and the above explanation with respect thereto). Means 42 (e.g., a sleeve element with outwardly flarred ends) unite not only the disk 46 to the composite base 59 and 60, but also unite the compass part 59 and orientation part 60 at an axial location. This axial mounting permits rotary shifting of the orientation of compass part 59 with respect to the orientation part 60 of the composite base unit. As an aid for the controller in recognizing and communicating the exact rotary shift position of the compass part 59 with respect to orientation part 60, it is also desirable to include on part 59 a complete "true" compass rose 48, as aforediscussed in connection with FIG. 6. Also, if desired the label "Top" 61 may be placed near the edge where the orientation mark "S" is located.

The modification of FIGS. 8 and 9 permits extraordinary versatility in creating problems of general orientation and proper runway selection for a student pilot. For example, the compass part 59 may be shifted with respect to orientation part 60 so that the 360° or "true" north for compass rose 48 is next to the U or east orientation mark. This fact may be communicated to a student pilot in a variety of ways. Illustratively, the student pilot may be told that the S orientation mark on his board represents both the top of his board and a westerly direction (or a 270° direction); alternately the pilot may be told that T represents a direction of 315°, and that his "plane," for the problem at hand, is headed in north north easterly direction (e.g., 20° on the compass rose 48). He may be told that he is heading toward the airport, or that it is to the left or right of his flight path, etc. These instructions must be "interpreted" by the pilot, and this can become complex, since the pilot does not view a compass rose and must visualize "-north" as being other than at the "top" of his board. In this way, the problem conditions under which the "-pilot" views his board can be made to more closely simulate the realism he encounters when in the air (where he must "view" a landing field at various odd angles of flight and with "north" being in a variety of relative locations). After setting up these conditions, or simultaneously (or possibly before setting up these conditions) the "pilot" is told that he should orient his board with the orientation pointer on his disk at some arbitrarily selection location (e.g., 10° to the right of the orientation mark "S," as illustrated in the drawings).

In use of the boards illustrated in the drawing (after preliminarily establishing any conditions and relationships as required when the controller board of FIGS. 8 and 9 is used), the controller arbitrarily selects a base orientation mark (e.g., the letter V) and moves the orientation mark 44 on his disk unit 40 to that base symbol, instructing the pilot to orient the mark 15 on his disk 10 toward the V on the base member 11. The controller may also, for example, advise the pilot to place his board before him with the east compass direction nearest him (to simulate an incoming approach toward the west); or the pilot may select his incoming approach angle. The controller then spins the spinner on his board, notes the numeral indicative of compass direction at a view site nearest the location of the spinner after it comes to rest, and calls that number to the pilot. The pilot selects the runway he assumes to be correct without moving his board, and advises the controller of the runway approach code figure at the end of that runway. Controller checks the code figure given by the pilot against the code figure adjacent the view site through which the controller viewed the numeral called to the pilot. Repeated practice with these devices greatly improves skill by the pilot in making his runway landing selection; and this is possible with considerable realism without need for being airborne during the learning process.

That which is claimed is:

1. A pilot board adapted to be used in simulated practice for proper runway selection and aircraft approach to said runway for landing, consisting essentially of a disk member and a base member, means uniting said members together for relative rotary indexing of one with respect to the other about an axis coinciding with the axis for said disk member, orientation means to establish a variety of selected rotary orientations of said disk member with respect to said base member, said orientation means comprising at least one visibly distinct orientation mark on each said member at a radially disposed location from said axis, and a simulated runway layout visibly distinct on said disk member, with each runway end marked with a visibly distinct runway approach code figure, each one of said code figures being different from the others, all of said aforementioned visibly distinct elements being viewable from one face of said pilot board, said relative rotary indexing of said members being such as to allow selection of a variety of rotary orientation between said members to thereby present a variety of problem conditions for proper runway selection and aircraft approach to said selected runway for landing.

2. The pilot board of claim 1 additionally comprising a visibly distinct indicator on said base member.

3. The pilot board of claim 2 wherein said visibly distinct indicator identifies a compass direction.

4. The pilot board of claim 1, wherein said orientation means consists essentially of visibly distinct orientation marks on said memberS, one of said members carrying at least said one visibly-distinct orientation mark and the other of said members carrying a plurality of such marks annularly spaced at radially disposed locations from said axis, each one of said annularly spaced orientation marks being different from the others, said relative rotary indexing of said members with respect to each other being such as to permit positioning of said one such orientation mark by any one of said annularly spaced orientation marks for a said selected orientation.

5. The pilot board of claim 1 wherein said base member comprises a flat peripheral flange extending radially outwardly beyond the periphery of said disk member.

6. The pilot board of claim 5 wherein the means uniting said disk member and said base member for selected rotary orientation comprises interlocked male and female parts of said members.

7. The pilot board of claim 1 wherein said disk member is plastic and wherein said visibly distinct elements thereon are printed.

8. The pilot board of claim 1 wherein said disk member is metallic.

9. The pilot board of claim 1 wherein said relative rotary indexing between members is friction-biased to oppose free spinning motion of one of said members with respect to the other.

10. A controller board in combination with a pilot board, said pilot board comprising a disk member and a base member united for relative rotary indexing therebetween, with means to establish selected rotary orientations of the disk member to the base member, and the disk member being equipped with a simulated runWay layout having a different runway approach code figure at each runway end, said controller board comprising:

i. a disk unit,
    ii. a base unit,
    iii. means uniting said units together for relative rotary indexing of one with respect to the other about an axis coinciding with the axis for said disk unit.

iv. means to establish a variety of selected rotary orientations of one of said units with respect to the other of said units, corresponding to the means to establish selected orientations between said disk member and said base member of said pilot board, v. a plurality of annularly spaced view sites on said one unit at locations equidistantly radially disposed from said axis of rotary indexing, the number of said view sites being equal to two times the number of runways of said layout on said pilot board, one of said view sites being at each radial location determined by making the radial angle between said radial location and a predetermined mark on said one unit equal to an angle on said pilot board formed at the intersection between a runway and a line parallel to a radial line through a corresponding predetermined mark on said disk member of said pilot board, vi. a visibly distinct runway approach code figure associated with each said view site, each said code figure corresponding in character to the runway approach code figure at the end of the runway on said pilot board to which said view site corresponds, and vii. an annular sequence of numerals on the other of said units at radially disposed locations permitting view of the same at said view sites at selected orientations between said units, said numerals being representations of graduated compass directions, said numerals being so arranged that, when said units are in selected orientation corresponding to a selected orientation between said members of said pilot board, the numeral viewed at a selected view site constitutes an indicator of a compass direction toward which an aircraft should land and the proper approach end of a simulated runway on said pilot board for effecting that landing direction carries a runway approach code figure corresponding to the runway approach code figure associated with said selected view site.

11. The combination of claim 10 wherein the controller board has a spinner mounted for relatively free spinning motion about the axis for said rotary indexing of said controller board units, said spinner serving at rest as a pointer for selection of a view site and the numeral indicating compass direction as observed thereat.

12. The combination of claim 10 wherein the orientation means of the pilot board consists essentially of a single orientation mark on one said member of said pilot board and a plurality of different annularly spaced orientation marks on the other said member of said pilot board; and wherein the orientation means of said controller board corresponds to the orientation means of said pilot board in that the orientation marks and the radial location thereof on said one unit and said other unit of said controller board correspond respectively to the orientation marks and radial location thereof on said disk member and said base member of said pilot board.

13. The combination of claim 10 wherein the controller board is additionally equipped with an aircraft indicator rotatably indexable about said axis, whereby the approach direction of an assumed aircraft to the simulated runway layout of said pilot board may temporaRily be established on said controller board.

14. The combination of claim 10 wherein the controller board additionally comprises means for effecting rotary shifting of
a. said annular sequence of numerals representative of compass directions in a manner independent of
b. orientation between said disk unit and said base unit.

15. The combination of claim 10 wherein said other of said units of said controller board comprises an orientation part and a compass part, said orientation part carrying at least one fixed orientation mark thereon, said compass part carrying said annular sequence of numerals representative of compass directions thereon, and means for effecting rotary shifting of said orientation part and compass part with respect to each other about an axis coinciding with said axis for rotary indexing between said disk unit and said base unit.

* * * * *

UNITED STATES PATENT OFFICE
CERTIFICATE OF CORRECTION

Patent No. 3,680,230      Dated   August 1, 1972

Inventor(s) Philip H. Thompson

It is certified that error appears in the above-identified patent and that said Letters Patent are hereby corrected as shown below:

Column 1, cancel lines 5 through 23, inclusive and insert same on the cover sheet under [57] as part of the ABSTRACT. Column 2, line 56, "for", end of the line, should read -- or -- . Column 3, line 21, "an (e.g., sequence", should read -- an annular sequence -- ; line 42, "training is", should read -- training, is -- ; line 64, "member" should read -- members -- . Column 5, line 40, "anyone" should read -- any one -- . Column 13, line 2, "." should read -- , -- .

Signed and sealed this 20th day of March 1973.

(SEAL)
Attest:

EDWARD M. FLETCHER, JR.          ROBERT GOTTSCHALK
Attesting Officer                Commissioner of Patents